Aug. 8, 1939. J. MIHALYI 2,169,001
CAMERA SHUTTER SETTING AND FILM WINDING MECHANISM
Filed Feb. 1, 1938 2 Sheets-Sheet 1
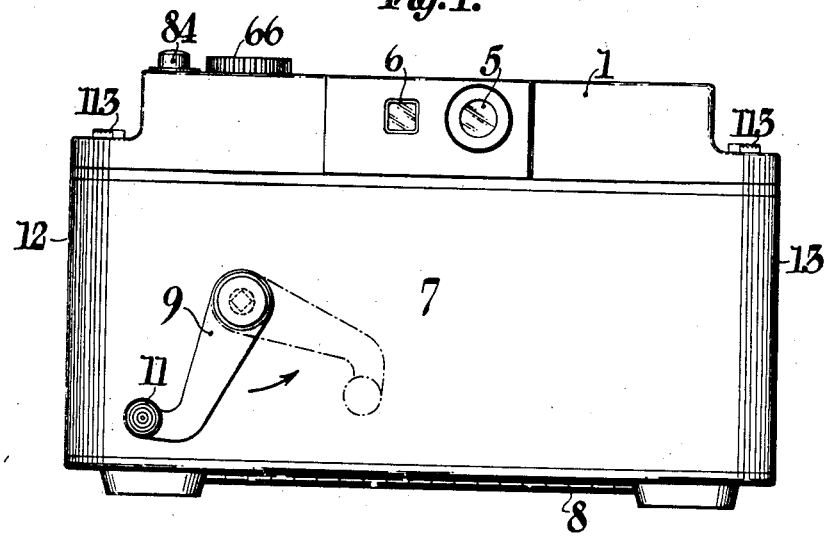
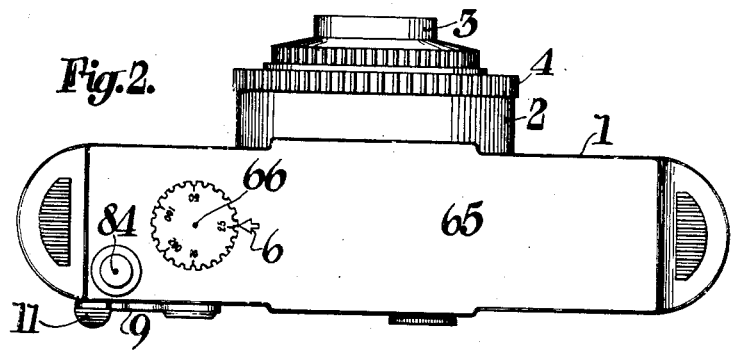
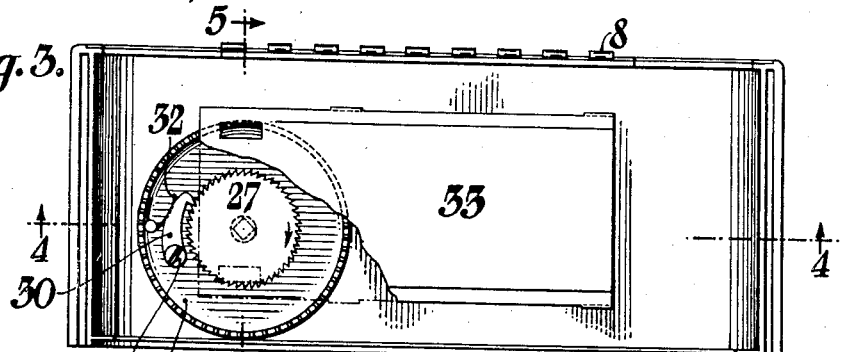
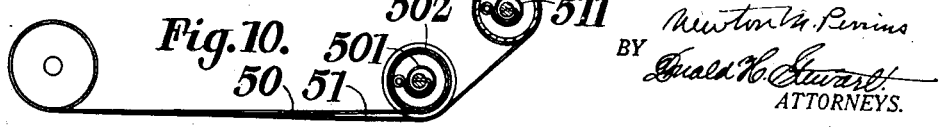
Joseph Mihalyi
INVENTOR.
BY
ATTORNEYS.

Aug. 8, 1939.                J. MIHALYI                2,169,001
CAMERA SHUTTER SETTING AND FILM WINDING MECHANISM
Filed Feb. 1, 1938                    2 Sheets-Sheet 2
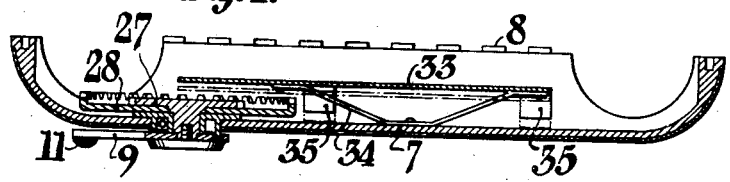
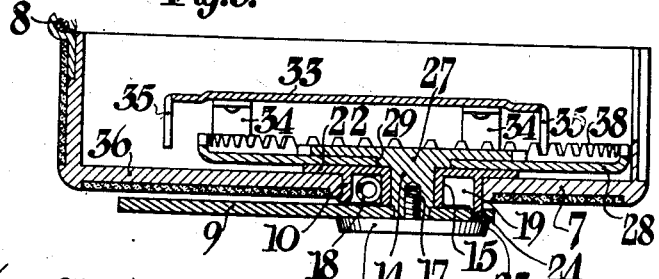
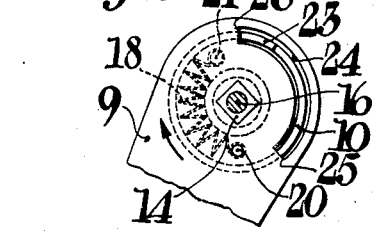
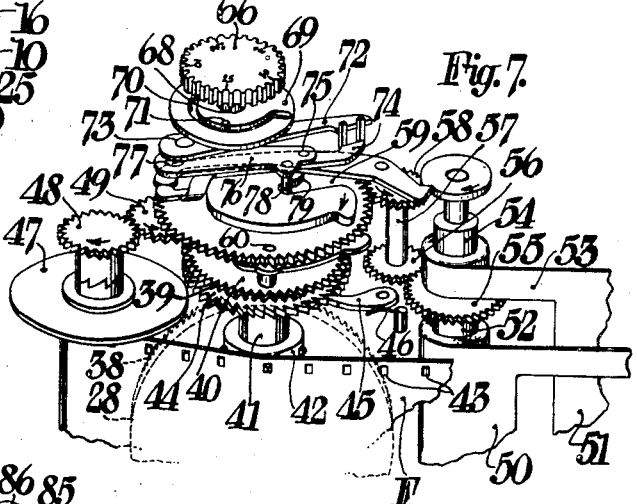
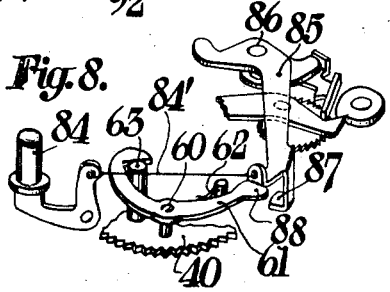
Joseph Mihalyi
INVENTOR.
BY
ATTORNEYS.

Patented Aug. 8, 1939

2,169,001

UNITED STATES PATENT OFFICE 2,169,001

CAMERA SHUTTER SETTING AND FILM WINDING MECHANISM

Joseph Mihalyi, Rochester, N. Y., assignor to Eastman Kodak Company, Rochester, N. Y., a corporation of New Jersey Application February 1, 1938, Serial No. 188,118

10 Claims. (Cl. 95—31)

This invention relates to photography and more particularly to photographic cameras.

One object of my invention is to provide a camera equipped with a shutter of the setting type with a means for setting the shutter mounted on the camera back. Another object of my invention is to provide a camera of the type described with a disconnectible mechanism extending between the camera back and the camera body so that the back can be freely opened for the removal and insertion of film. Another object of my invention is to provide a camera of the type described in which mechanism on the camera body may be moved or partially moved by a lever on the camera back and to provide a one-way clutch structure which will retain the shutter setting mechanism in a fully or partially set position permitting the camera back to be opened at any time. Still another object of my invention is to provide a mechanism carried by the camera back in a position to be readily operated while the camera is held in a picture-taking position at eye level for setting the camera shutter. Still another object of my invention is to provide such a mechanism in which the film may be wound simultaneously with setting the shutter. A still further object of my invention is to provide an operating member on the camera back for moving a shutter setting member carried by the camera body and to provide a means for disconnecting said operating members. Another object of my invention is to provide gearing on the camera body arranged to one side of the film path and gearing on the camera back positioned to mesh with the camera body gearing on one side of the film path, so that motion may be transmitted from a lever carried in the center near one end of the camera back to the setting shutter and to provide means for also winding the film by the shutter setting operation. Other objects will appear from the following specification, the novel features being particularly pointed out in the claims at the end thereof.

In cameras designed primarily for making a series of pictures rapidly or designed primarily for taking the so-called "candid" camera pictures, it is desirable to have a mechanism which can be quickly operated while the camera is held in a pictue-taking position at eye level. Since such cameras usually require relatively high shutter speeds in order to stop motion, it is customary to provide such cameras with high speed shutters of the type requiring setting before the shutter is released. Such shutters may be of the between-the-lens type including a spring which must be manually placed under tension before an exposure can be made or the shutters may be of the focal plane type which also include a spring drive, the spring of which must be tensioned before making an exposure.

Since cameras of the so-called miniature type usually utilize roll film, it is also desirable to provide a means which not only sets the shutter, but also winds the film, and to provide an operating member in a convenient location on the camera back for both setting the shutter and operating the film.

Coming now to the drawings, wherein like reference characters denote like parts throughout:

Fig. 1 is a rear elevation of a camera embodying a preferred form of my improved winding mechanism.

Fig. 2 is a top plan view of the camera shown in Fig. 1.

Fig. 3 is a plan view of the camera back removed from the camera shown in the preceding figures.

Fig. 4 is a section through the camera back on line 4—4 of Fig. 3.

Fig. 5 is a greatly enlarged section taken on the line 5—5 of Fig. 3.

Fig. 6 is an enlarged detail in elevation, showing a portion of the winding handle and winding handle control.

Fig. 7 is a schematic view in perspective, showing portions of the film winding and shutter setting mechanism.

Fig. 8 is a schematic fragmentary perspective view, showing portions of the shutter releasing mechanism.

Fig. 9 is a fragmentary detail view of a portion of the shutter controlling mechanism.

Fig. 10 is a schematic plan view showing the relationship of the focal plane shutter curtains and the spring driving mechanisms therefor.

In the preferred embodiment of my invention shown in the drawings, the camera may comprise of a camera body 1, from which a tubular member 2 extends outwardly to support an objective, the front element of which may be mounted in the lens cell 3. A suitable knurled ring 4 may be used for focusing the objective, and this is preferably done with any of the known types of mechanically operated range finders.

The range finder is not a part of the present invention, but the rear sight for the range finder is indicated at 5 as being adjacent the rear sight 6 of a view finder. This camera is of the type generally held at eye level, and the winding mechanism has been particularly designed for rapid operation while the camera is held so that an operator may move the winding handle while viewing the object being photographed either through the view finder opening 6 or the range finder opening 5.

The camera is provided with a movable camera back 7, which is here shown as being hinged at 8 to the camera body 1. On this camera back, I provide a winding handle 9 adapted to turn in a suitable bearing 10, best shown in Fig. 5, carried by the camera back 7. The handle 9 terminates in a finger grip 11, which is preferably knurled so that it may be readily operated by a thumb or finger of a hand holding the end 12 of the camera, since cameras of this type are usually held by the two hands of the operator grasping the ends 12 and 13 of the camera.

As indicated in Figs. 4 and 5, the handle 9 is attached to a shaft 14 passing through a central portion 15 of the bearing member and being attached to the shaft 14 by means of the nut 16 which is threaded at 17 thereto.

In order to hold the handle in its normal position of rest shown in Fig. 1, I provide a spring 18 which lies in the annular recess 19 in the bearing member 10. This spring may be attached at one end of a pin 20 carried by the handle 9 and may be attached at the other end to a pin 21 carried by the base or flange 22 of the bearing member 10. The spring tends to move the handle in the direction shown by the arrow in Fig. 1, in which position the handle may be held by the lug 23 which extends up through a slot 24 in the handle. As the handle is moved in a counterclockwise direction with regard to Fig. 1, it may move from the full to the dot-and-dash line position in Fig. 1, at which time the opposite end 25 of the slot will strike the upstanding lug 23 and thus limit the total movement of the handle. This operation, of course, places the spring 18 under tension, and as soon as the handle is released, it will move smoothly back to its position of rest, in which the lug 23 engages the end 26 of the slot 24. It is understood that the head 16 of the screw, as shown in Fig. 5, covers the slot 24 and the lug 23, so that dust and dirt is prevented from entering.

The shaft 14 is integral with or is attached to a ratchet wheel 27 so that each time the handle is moved back and forth, the ratchet wheel is moved back and forth. Mounted coaxially with the ratchet wheel 27 is a dished gear 28, this dished gear being free to turn upon a shoulder 29 of the ratchet wheel which forms a shaft on which the dished gear may turn.

This dished gear 28 carries a pawl 30 mounted on a pivot 31 and pressed by a spring 32 into contact with the ratchet wheel 27. Movement of the ratchet wheel in the direction shown by the arrow in Fig. 3 will cause the dished gear 28 to move through the engagement of the pawl with the ratchet wheel 27. This movement occurs only when the handle is being moved in the direction shown by the arrow in Fig. 1, in which the handle 9 is manually operated. When the handle comes to a stop and is returned to its initial position by means of the spring 18, the light spring 32 permits the pawl to ride idly while the ratchet wheel turns in a reverse direction, so that the dished gear 28 is only moved in one direction.

The dished gear, pawl and ratchet wheel are all mounted on the wall of the camera back 7, and they are mounted beneath a film pressure plate 33. This pressure plate is supported by the spring arms 34 which tend to move the pressure plate away from the back to hold the film against the usual exposure frame. In order to prevent the pressure plate from being moved too far, and into engagement with the pawl and ratchet and dished gear mechanism, there are preferably four downwardly extending arms 35, as best shown in Figs. 4 and 5, which are adapted to contact with the inside wall 36 of the camera back so that the maximum displacement of the film pressure pad 33 is shown in the broken line position in Fig. 4. In this position, it will be noted that the pressure pad is still spaced from the winding mechanism so that regardless of its position, it cannot affect the operation of this part of the winding mechanism.

The teeth 38 of the dished gear are preferably of a pointed variety, so that when the camera back is moved, as by swinging it about the hinge 8, to close the film chamber of the camera after loading film therein, the teeth 38 will be automatically meshed with the teeth 39 of a gear 40 which is fixedly mounted on the shaft 41, carrying a film sprocket 42 which may measure off a section of the film F through engagement with the sprocket apertures 43 therein. I prefer to form the sprocket 42 of such a size that a single revolution will measure off one exposure of film. It is therefore necessary to turn the gear 40 one revolution for winding the proper amount of film into place.

Also affixed to shaft 41 is a ratchet wheel 44 which is permitted to turn in one direction only by a pawl 45 pressed by a spring 46 into engagement with the ratchet. Thus, the sprocket 42 is only permitted to turn in one direction through this pawl and ratchet, and this direction, in the present instance, is in the direction shown by the arrow, toward the film winding spool 47. This spool is driven by a suitable friction clutch, which may be of any desired type and which is not shown in the drawings, through the gears 48 and 49, the latter gear meshing with gear 40. Thus, when the dished gear 28 is turned by the handle 9, gears 48 and 49, through the friction clutch, also drive the take-up reel 47 to wind film thereon. The clutch between the gear 48 and the spool 47 normally slips slightly at each actuation because it is necessary to tend to drive the take-up spool slightly more than the distance the spool will turn because of the varying diameter of the spool due to the building up of convolutions of film thereon.

The turning movement of the gear 40 also winds up the focal plane shutter, a portion of which is shown in Fig. 7. This shutter may consist of the usual two curtains 50 and 51, curtain 50 being wound upon a drum 52, and the tapes 53 of curtain 51 being wound on the spools 54. It is understood that the opposite ends of these curtains are each separately attached to the usual type of spring rollers. The curtains may be driven in one direction by a gear 55 meshing with gear 56, carried by a shaft 57 meshing with a second gear 58, which, in turn, meshes with a large gear 59. This gear carries a pivot 60 on which a tripping latch 61, best shown in Fig. 8, is attached, this latch being normally pressed by a spring 62, also carried by the gear 60, into a position to engage a pin 63 which is carried by the gear 40. When the parts are in engagement, as shown in Fig. 8, movement of the gear 40 in a clockwise direction will also carry gear 59 in the same direction. Due to the latch member 61, it will turn the gear 59 until one revolution is complete, this revolution being adapted, through the gears 55, 56 and 58, to wind up the focal plane shutter.

As indicated in Fig. 10, the shutter curtain 50 derives its power through a spring 501 carried inside of the spring-driven drum 502. Similarly, curtain 51 derives its power through a spring 511 carried inside of drum 512. This power drive for the focal plane shutter is placed under tension by turning the spools 54 and drum 52 through the gearing shown in Fig. 7 and carried by the camera body from the gear 28 carried by the camera back through handle 11. As above mentioned, I have very fully illustrated the focal plane shutter in my Patent No. 2,140,446 granted December 13, 1938, so reference may be had to that application for further details.

I wish to point out, however, that any other type of setting shutter may be used if desired, and I have merely used the shutter shown in my copending application as a preferred embodiment of my invention.

The focal plane shutter may be of the type shown in my patent above identified and while the construction of this shutter is not important to the present application, the releasing mechanism will be briefly described.

On the top wall 65 of the camera, I provide a speed setting disk 66 which may be graduated into suitable units of speed and which may be moved to an indicator 67 to set the shutter for the desired speed. This dial 66 is shown in Fig. 7 and is attached to a shaft 68 which also carries a disk 69 on which a cam slot 70 is cut. A pin 71 extends up in this cam slot, and since this pin is attached to a lever 72, pivoted at 73 to a support, not shown, it regulates the position of the lever 72. This lever forms a stop for a second lever 74, pivoted at 75 to a lever 76 which, in turn, is pivoted at 77 to a support, and which carries a downwardly extending pin 78 which is adapted to engage and ride on the cam surface 79 as the gear 60, to which the cam is permanently attached, is moved.

As indicated in Fig. 9, the shaft 41 carries a cam 80, the object of which is to control the rotation of the shaft 41. This cam may be engaged by a latch member 81 which may turn freely on a shaft 82 and which is pressed by a spring 83 toward the cam. When the shutter is in position for exposure, the parts are adapted to lie in the position shown in Fig. 9. In order to make an exposure, the trigger 84 is depressed, this trigger being connected by a wire 84' to the lever 85, which is pivoted at 86 and which carries a downwardly and inwardly formed operating arm 87.

By depressing the trigger, the part 87 comes in contact with the tail 88 of the latch member 61, thus moving the latch away from the pin 63 and disconnecting the gears 40 and 60. As soon as the gear 60 is disconnected, it turns under the impulse of the shutter curtain springs, which have been previously placed under tension, and the movement of this gear 60 is limited to one revolution or approximately 360°.

This is accomplished by means of a slidable stop 90 which consists of a plate having slots 92 passing around the studs 91. As indicated in Fig. 9, the shaft 60, which carries the latch 61, extends down beyond this latch element and into the patch of the upstanding stop 90. With the parts in the position shown in Fig. 9, when the shutter is operated, the pin 60 will travel around through the path shown in broken lines at P, being stopped by striking the opposite side of the upstanding stop 90. This movement is only accomplished after the latch member 81 is released, this releasing operation taking place simultaneously with the release of the lever 60.

Thus, as the tripping member 87 moves against the tail 88 of the latch 61, it likewise cams latch 81 away from the cam 80 on the shaft 41, which permits this shaft to turn as above described.

When the shutter has been operated and the pin lies on the right-hand side of the stop 90, with reference to Fig. 9, by turning the handle member 9 to wind the film and set the shutter, the pin will reverse its path, passing in a counter-clockwise direction around the path indicated by dotted lines at P, until it strikes the left-hand edge of the stop 90. In this position the cam 80 will again be engaged by the latch member 81 and the shutter parts will be held in position for another exposure.

I will not herein describe fully the arrangement by which the shutter curtains 50 and 51 are separately moved to vary the slot between the two curtains for varying the duration of the exposures which can be made with this shutter, because it is not necessary for a complete understanding of the present invention and because it forms the subject matter of my patent above identified.

As described in the above specification, the operation of taking pictures can be very rapidly carried out with the preferred form of mechanism which I have described herein. Assuming an operator has just completed making an exposure and wishes to make another one, the operating handle 11 may be rapidly pushed one or more times to the right, as viewed in Fig. 1, to wind the film. The operator needs to pay no attention whatsoever to the extent of the stroke of this winding lever, because when the pawl and ratchet mechanism 27 and 31 have been wound a sufficient amount to rotate the gear 40 one revolution, the stop, illustrated in Fig. 9, will definitely stop further winding movement of the handle. The operator, therefore, without attention to the amount of winding that has been accomplished, automatically positions a fresh area of film in front of the exposure aperture of the camera and automatically winds up the shutter. If the speed dial has been set for the desired exposure, it is then only necessary to press the trigger member 84 to make the exposure. After an exposure has been made, the handle 9 can again be operated as above described.

This structure has a good many advantages over the better known type of film winding devices and shutter setting devices, in that a single lever is all that is utilized to accomplish both purposes and that the amount of winding which takes place with this lever is automativally controlled. Moreover, the winding lever is arranged on the back of the camera near the bottom thereof in a natural position to be operated by the thumb of one hand which is grasping the end 12 of the camera, these cameras usually being held by both hands of an operator grasping the ends 12 and 13. The film winding and shutter setting operations do not therefore, require an operator to release his hold on the camera, nor for that matter, it is necessary to remove the camera from its picture-taking position, in which the view can be watched through the view finder 6.

Providing a shutter setting mechanism on the camera back and providing gearing between such mechanism and the camera body does not in any way affect the operation of loading, since the mechanism on the camera back may be disconnected from the mechanism in the camera at any time by merely moving the camera back relative to the camera body in the normal method for loading. It should be noted that when the camera back has been removed, the setting mechanism is always retained in a fully or partially set position by means of the one-way clutch mechanism so that there is no necessity of having any indexing arrangement whatsoever between the mechanism carried by the camera back and the camera body.

By merely moving the camera back to its operative position, in which it encloses the spool chambers and exposure frame of the camera body, the gears 28 and 40 are automatically brought into mesh and it is only necessary to move the hand lever 11 until it definitely comes to a stop to complete the tensioning of the shutter and also the winding of the film.

This application illustrates and describes a preferred embodiment of my invention. I have found the location of the winding lever extremely desirable since it permits the thumb of the left hand of an operator holding the camera at eye level to rapidly operate the lever 11 without lowering the camera, and thus makes it possible to obtain pictures quickly which otherwise might be lost.

Obviously, many changes may be made from the embodiment herein illustrated without departing from my invention, and I consider as within the scope of my invention all such forms as may come within the scope of the appended claims.

What I claim as my invention and desire to be secured by Letters Patent of the United States is:

1. In a roll holding camera, the combination with a camera body having an exposure frame, a camera back movably mounted on the camera body and adapted for movement to and from an operative closed position covering the exposure frame, a shutter of the setting type carried by the camera body, a movably mounted lever carried by the camera back, movable elements carried by the camera body and back and including said lever positioned to engage each other when said camera back is in an operative position and to be disengaged when said back is moved from its operative position, whereby said shutter may only be tensioned when said back is in an operative position.

2. In a roll holding camera, the combination with a camera body having an exposure frame and film spool chambers, of a movably mounted camera back adapted to move to and from an operative closed position with respect to the camera body in which the exposure frame and spool chambers are enclosed, a shutter of the type requiring setting carried by the camera body, a lever for setting the shutter movably carried by the camera back, and cooperating movably mounted elements carried by the camera back and including said lever and camera body positioned for operative engagement when said camera back is in a closed position for connecting the lever on the back to the shutter setting mechanism.

3. In a roll holding camera, the combination with a camera body having an exposure frame and film spool chambers in which a film supply and a take-up spool may be mounted, of a movably mounted camera back adapted to move to and from an operative closed position with respect to the camera body in which position the exposure frame, film spool chambers and film drawn from the supply to a take up spool across the exposure frame are all enclosed, a shutter of the type requiring setting carried by the camera body in front of the exposure frame, means for tensioning the shutter, including a lever movably mounted on the camera back, elements carried by the camera body and back including the lever and having a cooperative position to one side of the path of film passing across the exposure area for normally connecting the lever on the camera back to the means for tensioning the shutter, whereby movement of the lever on the camera back behind the film may set the shutter located in front of the film.

4. In a roll holding camera, the combination with a camera body having an exposure frame and film spool chambers in which a film supply and a take-up spool may be mounted, of a movably mounted camera back adapted to move to and from an operative closed position with respect to the camera body in which position the exposure frame, spool chambers and film drawn from the supply to the take up spool across the exposure frame are all enclosed, a shutter of the type requiring setting carried by the camera body in front of the exposure frame, means for tensioning the shutter, including a lever movably mounted on the camera back, elements carried by the camera body and back and including said lever having a cooperative position to one side of the path of film passing across the exposure area for normally connecting the lever on the camera back to the means for tensioning the shutter, whereby movement of the lever on the camera back behind the film may set the shutter in front of the film passing through the camera, said elements carried by the camera body and back being disconnectable, whereby the camera back may be moved from its operative position for inserting film into and removing film from the camera spool chambers.

5. In a roll holding camera, the combination with a camera body having an exposure frame, a camera back removably mounted on the camera body and adapted for movement to and from an operative closed position covering the exposure frame, a focal plane shutter carried by the camera body in front of the exposure frame, a spring drive for the focal plane shutter, means for tensioning the spring drive comprising gearing carried by the camera body, gearing carried by the camera back adapted to mesh with a gear on the camera body when the back is moved into operative position closing the camera, said gears on the camera body and back meshing to one side of the exposure frame, and a handle carried by the camera back for operating said gearing.

6. In a roll holding camera, the combination with a camera body having an exposure frame, a camera back removably mounted on the camera body and adapted for movement to and from an operative closed position covering the exposure frame, a focal plane shutter carried by the camera body in front of the exposure frame, a spring drive for the focal plane shutter, means for tensioning the spring drive comprising gearing carried by the camera body, gearing carried by the camera back adapted to mesh with a gear on the camera body when the back is moved into operative position closing the camera, said gears on the camera body and back meshing to one side of the exposure frame, and a handle carried by the camera back for operating said gearing, and means carried by the camera body gearing for preventing movement of said gearing in one direction, whereby said shutter tensioning means may remain in a fully or partially tensioned position when said camera back is opened.

7. In a roll holding camera, the combination with a camera body including an exposure frame and spool chambers, of a movably mounted camera back for enclosing the exposure frame and spool chambers, a winding mechanism carried by the movable camera back comprising a lever on the outside of the camera back, a shaft passing through the back and a gear on the inside of the back and carried by the shaft, a shutter of the type requiring setting before an exposure can be made carried by the camera body and including a gear, with which the gear on the camera back may mesh, whereby said handle on the camera back may set said shutter, and a trigger for releasing the shutter to make an exposure.

8. In a roll holding camera, the combination with a camera body including an exposure frame and spool chambers, of a movably mounted camera back for enclosing the exposure frame and spool chambers, a winding mechanism carried by the movable camera back comprising a lever on the outside of the camera back, a shaft passing through the back and a gear on the inside of the back and carried by the shaft, a shutter of the type requiring setting before an exposure can be made mounted on the camera body and including a gear with which the gear on the camera back may mesh, whereby said handle on the camera back may set said shutter, a trigger for releasing the shutter, a film winding spool carried by the camera body, and gearing between the film winding spool and shutter setting gear, whereby the film may be wound and the shutter may be set by the winding handle on the back of the camera.

9. In a roll holding camera, the combination with a camera body including an exposure frame and spool chambers, of a movably mounted camera back for enclosing the exposure frame and spool chambers, a winding mechanism carried by the movable camera back comprising a lever on the outside of the camera back, a shaft passing through the back and a gear on the inside of the back and carried by the shaft, a shutter of the type requiring setting before an exposure can be made mounted on the camera body and including a gear with which the gear on the camera back may mesh, whereby said handle on the camera back may set said shutter, a trigger for releasing the shutter, a film winding spool, and gearing between the film winding spool and shutter gear whereby the film may be wound and the shutter may be set by the winding handle on the back of the camera, and means included in the camera gearing for holding the shutter in a fully or partially wound position whereby said handle may wind the film and shutter by oscillating one or more times as may be desired.

10. In a roll holding camera, the combination with a camera body including an exposure frame and spool chambers, of a movably mounted camera back for enclosing the spool chambers and exposure frame, a film winding shaft carried by the camera body, a focal plane shutter carried by the camera body, a shutter tensioning shaft carried by the camera body, gearing connecting the film winding and shutter tensioning shafts, a winding lever carried by the camera back, gearing operably connected to and adapted to be turned by said winding lever, said gearing being adapted to mesh with gearing on the shutter tensioning shaft, latch means adapted to hold the camera back in its operative closed position with the gearing on the camera body and camera back in mesh, said two sets of gears being separable when the latches are released and the camera back is moved from its operative position covering the exposure frame and spool chambers of the camera body.

JOSEPH MIHALYI.